(12) United States Patent
Engelbrecht et al.

(10) Patent No.: US 9,097,426 B2
(45) Date of Patent: Aug. 4, 2015

(54) BURNER AND FUEL LANCE FOR A GAS TURBINE INSTALLATION

(75) Inventors: Ernest Geoffrey Engelbrecht, Ennetbaden (CH); Anurag Jhalani, Untersiggenthal (CH); Bettina Paikert, Oberrohrdorf (CH); Richard Carroni, Niederohrdorf (CH); Michal Bialkowski, Untersiggenthal (CH); Madhavan Narasimhan Poyyapakkam, Mellingen (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 1170 days.

(21) Appl. No.: 12/422,497

(22) Filed: Apr. 13, 2009

(65) Prior Publication Data
US 2009/0277182 A1    Nov. 12, 2009

(30) Foreign Application Priority Data

May 9, 2008    (CH) .................................. 0724/08

(51) Int. Cl.
*F23R 3/12* (2006.01)
*F23R 3/30* (2006.01)
*F23R 3/36* (2006.01)
*F23R 3/14* (2006.01)
(Continued)

(52) U.S. Cl.
CPC . *F23R 3/36* (2013.01); *F02C 7/222* (2013.01); *F23D 11/36* (2013.01); *F23D 14/64* (2013.01); *F23D 17/002* (2013.01); *F23R 3/12* (2013.01); *F23R 3/14* (2013.01); *F23R 3/286* (2013.01); *F23R 3/346* (2013.01); *F23D 2204/10* (2013.01); *F23D 2214/00* (2013.01); *F23D 2900/14004* (2013.01)

(58) Field of Classification Search
CPC ............ F02C 7/22; F02C 7/222; F02C 7/228; F23R 3/12; F23R 3/18; F23R 3/20; F23R 3/286; F23R 3/30; F23R 3/283
USPC ............ 60/740, 742, 737, 739, 746, 749, 750
See application file for complete search history.

(56) References Cited

U.S. PATENT DOCUMENTS 4,589,260 A * 5/1986 Krockow ......................... 60/737
4,781,030 A * 11/1988 Hellat et al. .................... 60/743
(Continued)

FOREIGN PATENT DOCUMENTS

EP    0623786 A1    11/1994
EP    1030109 A1    8/2000
(Continued)

*Primary Examiner* — Andrew Nguyen
(74) *Attorney, Agent, or Firm* — Buchanan Ingersoll & Rooney PC (57) ABSTRACT

A lance is presented for introducing fuel into a second burner of a combustion chamber of a gas turbine installation with sequential combustion, having a first and a second combustion chamber. The lance includes a foot and a shank which projects from it. In an installed state of the lance the foot extends perpendicularly or at an angle to a main flow direction of the burner. The shank extends centrally in the burner and generally parallel to the main flow direction. At least one projecting arm, having at least one nozzle for introducing fuel, is arranged such that it extends from the shank. A respective end of the at least one arm is oriented in the main flow direction and extends generally parallel to the main flow direction.

18 Claims, 6 Drawing Sheets

(51) Int. Cl.
*F02C 7/22* (2006.01)
*F23D 11/36* (2006.01)
*F23D 14/64* (2006.01)
*F23D 17/00* (2006.01)
*F23R 3/28* (2006.01)
*F23R 3/34* (2006.01)

(56) References Cited

U.S. PATENT DOCUMENTS 5,193,346 A * 3/1993 Kuwata et al. ............... 60/737
5,365,738 A * 11/1994 Etheridge ..................... 60/742
5,498,155 A * 3/1996 Chyou et al. ................ 431/350
5,513,982 A 5/1996 Althaus et al.
5,613,363 A * 3/1997 Joshi et al. .................... 60/737
5,626,017 A * 5/1997 Sattelmayer .................. 60/723
6,609,905 B2 * 8/2003 Eroglu et al. ................ 431/284
6,755,024 B1 * 6/2004 Mao et al. ...................... 60/776
7,171,813 B2 * 2/2007 Tanaka et al. ................. 60/737
2004/0177615 A1 9/2004 Martling

FOREIGN PATENT DOCUMENTS

EP 1255080 A1 11/2002
EP 1462716 A1 9/2004

* cited by examiner

BURNER AND FUEL LANCE FOR A GAS TURBINE INSTALLATION

FIELD OF INVENTION

The present disclosure relates to a lance for introducing gaseous fuel into a second burner of a gas turbine installation with sequential combustion, which has a first and a second combustion chamber. The disclosure also relates to a method for operating a gas turbine with such a lance.

BACKGROUND

In the case of specific burners, for example in the case of premix burners, gaseous and/or liquid fuel can be introduced by a lance. As a rule, the fuel which is introduced via the lance serves for stabilizing a flame front in the combustion chamber or for a pilot operation of the combustion chamber. In the case of a special type of construction, the respective lance has a foot and also a cylindrical shank which projects from it essentially at right angles. Via the foot, the lance is supported on a burner wall in such a way that the foot extends transversely to a main flow direction of the burner, whereas the shank extends essentially centrally in the burner parallel to the main flow direction. For the introduction of the gaseous fuel, the lance is equipped with at least one nozzle on its shank.

Conventional burners, as are disclosed in EP0623786, operate as a rule with natural gas as gaseous fuel which is introduced via the lance into the burner. For a favorable mixing with the air which flows through the burner in its main throughflow direction, it has proved favorable to inject the fuel radially into the burner with regard to a longitudinal center axis of the shank, an example of which is disclosed in EP1030109.

The requirements for emissions at high hot gas temperatures and during partial load operation, and also for flexibility in operating behavior, have increased in recent years. Furthermore, in addition to air, installations in which additional oxidator gases are used for combustion of the fuel are also increasingly proposed. In addition to air, an oxidator gas for example can be a gas mixture which is obtained as a result of exhaust gas recirculation, or for example it can be an oxygenous product of an air separation plant.

It has been shown that with conventional burners and conventional lances the NOx emissions in the case of increasing hot gas temperature cannot be kept at a low level without great detriment in the case of partial load emissions and in pulsation behavior. Without further optimization, the fuels in the case of the required increased hot gas temperatures react with the oxidator gas before an adequate mixing is carried out, as a result of which on the one hand increased pollutant emissions can be established, and as a result of which on the other hand an increased risk of damage to the burner ensues due to flame flashback. If the fuel injection is optimized so that an adequate mixing for a low-emissions operation at the maximum hot gas temperature can be realized, then during partial load operation this leads to an extremely lean combustion with high CO emissions. Furthermore, the stability of the combustion is difficult to ensure, which can be manifested in harmful combustion chamber pulsations.

A similar problem also arises during the combustion of fuels which contain a comparatively high proportion of hydrogen gas and carbon monoxide gas. Such fuels, which for example can be formed as a result of a partial oxidation of conventional hydrocarbons, are also referred to as synthesis gas or syngas. Such fuels are characterized by a significantly increased reactivity compared with conventional fuels. Hydrogen and carbon monoxide react with oxygen much quicker and at already lower temperatures than carbonaceous fuels, such as natural gas, so that, just as in the case of the aforementioned increase of the hot gas temperature, the combustible gases react before an adequate mixing.

SUMMARY

The present disclosure is directed to a lance for introducing fuel into a second burner of a combustion chamber of a gas turbine installation with sequential combustion, having a first and a second combustion chamber. The lance includes a foot and a shank which projects from it. In an installed state of the lance the foot extends perpendicularly or at an angle to a main flow direction of the burner. The shank extends centrally in the burner and generally parallel to the main flow direction. At least one projecting arm, having at least one nozzle for introducing fuel, is arranged such that it extends from the shank. A respective end of the at least one arm is oriented in the main flow direction and extends generally parallel to the main flow direction.

The present disclosure is also directed to a method for operating a gas turbine with at least one annular combustion chamber having at least one burner, a combustion space which is connected to the outlet side of the burner, and a lance. The lance including a foot and a shank which projects from it, in an installed state of the lance the foot extends perpendicularly or at an angle to a main flow direction of the burner. The shank extends centrally in the burner and generally parallel to the main flow direction. At least one projecting arm, having at least one nozzle for introducing fuel, is arranged such that it extends from the shank, and in that the respective end of the at least one arm is oriented in the main flow direction and extends generally parallel to the main flow direction. The method includes regulating the fuel distribution dependent upon load and/or another operating parameter of the gas turbine.

Further important advantages and features of the present invention result from the dependent claims, from the drawings and from the associated figure descriptions.

BRIEF DESCRIPTION OF THE DRAWINGS

Preferred exemplary embodiments of the invention are shown in the drawings and are explained in more detail in the following description, wherein like designations refer to the same or similar, or functionally the same components. In the drawing, schematically in each case.

DETAILED DESCRIPTION OF THE PREFERRED EMBODIMENTS

Introduction to the Embodiments

A lance, or an improved embodiment for a burner which is equipped with it, is provided, which allows a stable, low-pulsation combustion, and which even at increased reaction speeds as a result of increased hot gas temperature or a combustible gas with high hydrogen and carbon monoxide content, enables a flame flashback-resistant and comparatively low-NOx combustion. In addition, with such a lance comparatively low CO pollutant emissions must be achievable at partial load. Furthermore, a suitable method for operating such a lance is to be disclosed.

The disclosure is based on the general idea of being able to discretely distribute the fuel via a multi-point injection. Furthermore, at least two nozzles are to be configured or arranged so that a main injection direction of the respective nozzle is not (exclusively) radial with regard to the longitudinal center axis of the shank, but is inclined in relation to the radial direction, in fact in the direction of a flow direction which prevails in the burner. In particular, the main injection direction of the respective nozzle can also be oriented exclusively axially, that is to say coaxially to the longitudinal center axis of the shank and therefore parallel to the main flow direction of the burner. As a result of this type of construction, it is possible for example to introduce the respective combustible gas into the burner at a higher velocity for increasing the resistance to flashback without the combustible gas jet penetrating into the slow boundary layer of a burner wall in which a reaction can occur on account of the long residence times before entry into the combustion chamber.

According to an advantageous embodiment, a plurality of nozzles can be provided, which are arranged in each case on an arm which projects radially from the shank with regard to a longitudinal center axis of the shank. Such arms for example can be arranged in a uniformly distributed manner on the shank in the circumferential direction. In addition, one nozzle can be provided in the longitudinal center axis of the shank in the flow direction. The length of the arms can be different so that injection is possible in a directed manner in different regions of the burner. The proposed burner has at least one flow obstruction upstream of the lance, which creates at least one vortex pair in the flow. The length and orientation of the arms from which fuel is introduced into the main flow via the nozzles is selected so that a stable, low-emissions operation is ensured.

For realizing low NOx emissions at high hot gas temperature, a good mixing of combustible gas and main flow is necessary, which is ensured by the aforementioned vortices. In order to realize a flame flashback-resistant combustion, the injection nozzles are positioned in the centers of the vortices.

For realizing low CO emissions at partial load with stable low-pulsation combustion, a locally increased fuel concentration in sections of the combustion chamber can be advantageous. For this purpose, injection nozzles can additionally be positioned in the boundary regions of the vortices.

In order to enable an optimum operation for all loads, a staging or regulating of the fuel injection in different regions of the main flow is furthermore proposed as a function of the load and of the fuel composition. At low load, the fuel is injected via at least one nozzle into the boundary region of at least one vortex. At high load, fuel is injected via at least one nozzle into the center of at least one vortex. During the transition from low load to high load, fuel can be injected both into the boundary region of at least one vortex and into the center of at least one vortex. Depending upon combustible gas composition, at maximum load a partial mass flow of fuel can additionally be injected into the boundary region of at least one vortex. For optimizing the emissions behavior and pulsation behavior, the mass ratios of the combustible gas which is injected via the different nozzles or nozzle groups can be varied. For highly reactive fuels, unstable combustion at partial load, especially extinction pulsations, as a rule are not a problem. With these, however, the feed of fuel into regions with recirculation or reduced flow velocity, as in the proximity of the burner wall, must be avoided. The fuel injection into different regions of the main flow can be regulated as a function of the reactivity accordingly. For example, with increasing reactivity the fuel portion which is injected into the vortex centers in increased, and the fuel portion which is injected into the boundary regions is reduced. The reactivity is typically proportional to the hydrogen portion of the combustible gas.

In order to be able to carry out the afore-described optimum operation of the combustion chamber with load-dependent injection into different vortex regions, a separate regulating of the fuel mass flow for the different nozzles can be provided. For cost reasons, and in order to avoid an excessively great complexity, it makes sense to combine different nozzles to form groups.

In one embodiment, the nozzles are combined to form two groups. The first group injects the fuel into the vortex centers, whereas the second group comprises the nozzles which inject the fuel into the boundary regions of the vortices.

Lances can be constructed both as lances for operation with combustible gas and for so-called "dual-fuel" operation by combustible gas or a liquid, typically oil, being selectively used as fuel. In the cases of lances for dual-fuel operation, the fuel injection is carried out via concentric pipes. Liquid fuel is injected via the innermost pipe. This is enclosed by the combustible gas pipe which in its turn is encompassed by a pipe with so-called carrier gas. The so-called carrier gas has essentially two functions. For one thing, it cools the lance inclusive of the injection nozzle, for another thing it forms an annular cool envelope around the fuel so that this remains below the self-ignition temperature until it has a sufficient distance from the nozzle in order to prevent a flame flashback. As a rule, the carrier gas is a recooled cooling air. The risk of a flame flashback, however, can be reduced by the use of inert gases or a reaction-inhibiting gas as carrier gas. Depending upon the combustible gas and operating conditions, an admixing of inert gases in the recooled cooling air can be sufficient for this purpose.

The liquid fuel or an emulsion of the liquid fuel in water is injected in a finely atomized state into the main flow via as known per se nozzles. In the case of gas turbines which are intended only for fuel gas operation, the liquid fuel pipe and nozzle can be dispensed with. The gas turbine can then be operated accordingly with only two concentric pipes for injecting combustible gas and carrier gas.

For regulating the fuel mass flows, at least one actuating element is to be provided in the fuel distribution system or in the lance itself. For space and accessibility reasons, the actuating element is typically arranged or integrated in the feed lines to the lance. As an actuating element, for example a fuel control valve is used. In order to realize a separate regulating for the injection of combustible gases into the centers of the vortices and into the boundary regions of the vortices via the correspondingly positioned nozzles, the fuel distribution system can be divided into two corresponding branches each with a separate actuating element.

An alternative arrangement operates with one actuating element, for example a control valve, for regulating the overall mass flow, and at least one actuating element which feeds or shuts off the mass flow for fuel injection into the boundary regions of the vortices and/or at least one actuating element which feeds or shuts off the mass flow for fuel injection into the centers of the vortices. This embodiment simplifies the integration of the actuating element into the lance or into the lance arms since it has to fulfill only a simple open-closed function and it can be operated with a simpler fuel distribution system.

As an actuating element for the fuel mass flow an upstream combustible gas compressor or a combination of combustible gas compressor and control valve can also be provided.

A further development moreover allows the regulating of the carrier gas volume. This is regulated either as overall mass flow or regulated in dependence upon the combustible gas flow for the individual nozzles or nozzle groups which is injected through the individual combustible gas nozzles. In the case of regulating, the carrier gas volume for example is proportional to the combustible gas volume, wherein, however, a minimum amount of carrier gas for cooling flows through the lance or the lance arm and the nozzle when shutting off a nozzle.

The injection of fuel and carrier gas is carried out in the flow direction, or with a velocity component in the flow direction, in order to introduce the fuel from the wake or vortex of the lance into the main flow.

According to another advantageous embodiment, a plurality of nozzles can be provided, which are arranged and configured for creating a multi-laminar flow in a core region of the fuel injection. In particular, at least two nozzles can be provided for this purpose, which are equipped so that they oppositely impose swirl upon the respective fuel flow. Oppositely rotating fuel flows for example can generate a multi-laminar flow. In this way, a further intensive mixing between fuel and oxidator for achieving a homogeneous fuel-oxidator mixture can be achieved. Nozzles for swirl generation can inject fuel and carrier gas both from the arms of the lance and from the shank. The intensity of the swirl in the case of highly reactive fuels is limited by the risk of a flame flashback. If a sufficiently intense counter-swirl for good mixing and combustion can be created by at least one pair of nozzles at the shank end, the arrangement of the arms can be dispensed with.

A further possibility of ensuring a flame flashback-resistant operation with different operating conditions and combustible gases is the introduction of a burner with variable lance position or with geometrically variable lance. The mixing of fuel and oxidator gas and also the safeguarding against flame flashback is dependent essentially upon the distance between lance end and burner end. On the one hand, as distance increases the mixing becomes better, on the other hand, the flammability increases with it, and as distance increases the flow velocity of the combustible gas reduces. If, for example, at high load a high combustible gas flow with correspondingly high velocity is injected, a safer combustion in the case of a large distance between shank end and burner end can be realized with good mixing. If, in contrast to this, at low load a smaller combustible gas flow with correspondingly low velocity is injected, the distance between shank end and burner end is reduced for a safer combustion. This ensures that the combustible gas velocity in the burner remains sufficiently high in order to prevent a flame flashback. Furthermore, the mixing path becomes shorter and the fuel concentration remains locally higher, as a result of which the combustion during the lean partial load operation is stabilized.

In order to realize such a variable distance between shank end and burner end, either the position of the lance foot during operation is adjusted in the axial direction with a corresponding adjusting device, or the shank length of the lance is varied. For this purpose, for example this can be constructed in a telescopically extendable manner. A combination of the two adjusting mechanisms is also possible. With the position of the shank end, the position of nozzles which are fastened on the shank via arms can also be varied.

Furthermore, a combination of the regulated injection into different regions of the burner with an adjustment of the position of the shank end is possible.

The regulating of the combustible gas distribution to primary combustible gas flow and secondary combustible gas flow, and also the adjustment of the position of the shank end, can be carried out in dependence upon different operating parameters of the gas turbine. A parameter which is also representative for the load of the combustion chamber for example is the relative load of the gas turbine, i.e. the quotient of momentarily delivered output and full load output. Further possible parameters for example are a process upper temperature such as the hot gas temperature or the turbine inlet temperature which directly describe the load of the combustion chamber. Furthermore, the position of at least one variable inlet guide vane row of the compressor, with which the intake mass flow and consequently also the mass flow through the combustion chamber is regulated, is an important parameter. The regulating can also be carried out in dependence upon the combustible gas volume accordingly. Furthermore, for example a regulating in dependence upon the turbine exhaust temperature or upon the combustion chamber pressure can be realized. In this case the regulating cannot be carried out only in dependence upon one parameter but also as a function of a combination of parameters.

DETAILED DESCRIPTION

Figure 1:
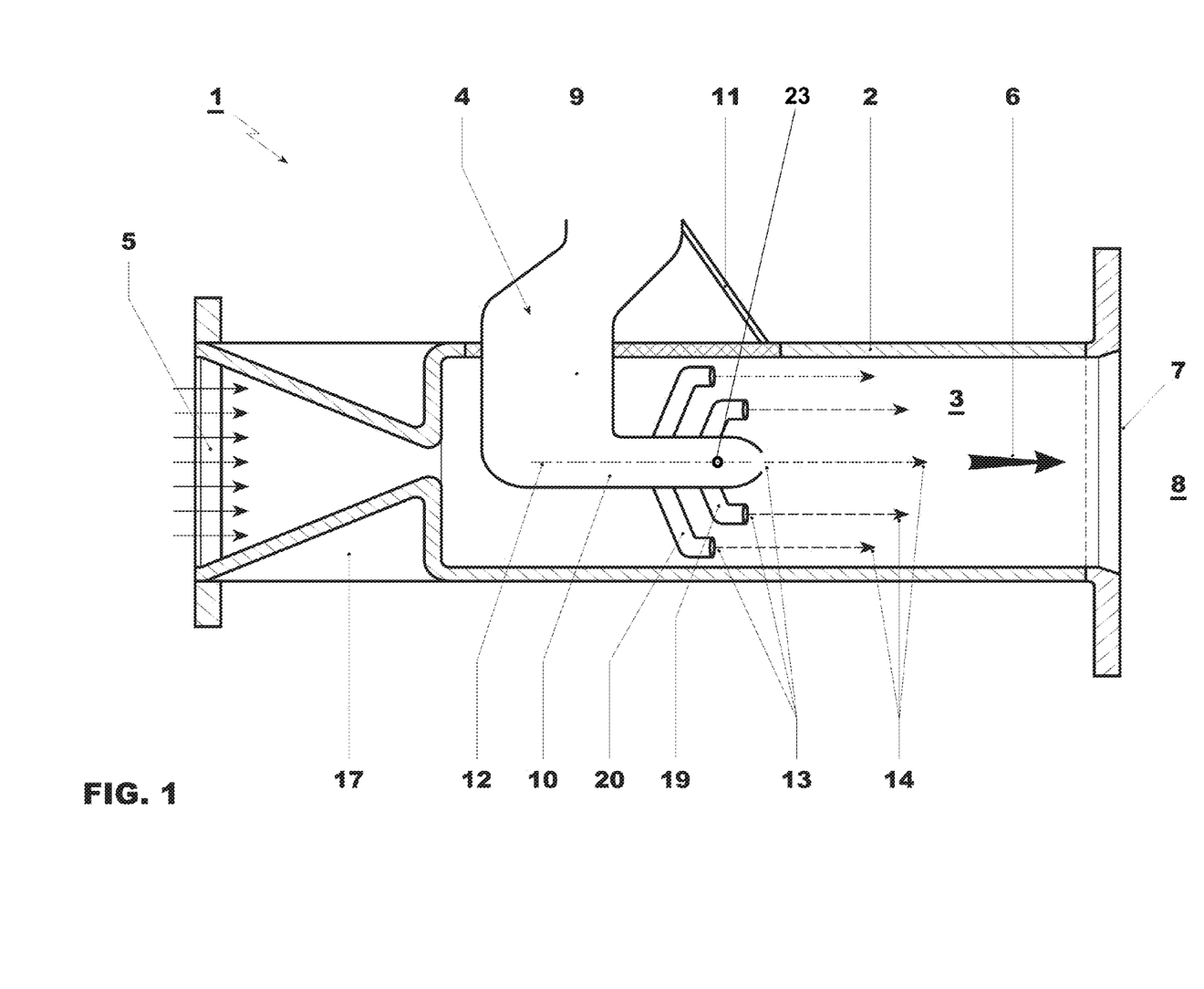
FIG. 1 shows a simplified longitudinal section through a burner with a lance.

According to FIG. 1, a burner 1 comprises a burner wall 2 which encloses a mixing chamber 3 of the burner 1. The burner 1 preferably forms a component part of a combustion chamber, which is otherwise not shown here, of a gas turbine installation. The burner 1 is equipped with a lance 4, by which a gaseous or liquid fuel can be introduced into the burner 1.

The burner 1 has an inlet side 5 through which an oxidator gas, such as air, enters the mixing chamber 3. The oxidator gas flow has a main flow direction 6 in the burner 1, which is indicated by an arrow, which extends parallel to a longitudinal axis of the burner 1. In order to ensure a quick mixing of fuel and oxidator gas, at least one vortex generator 17 is arranged in the inlet region of the burner 2. In addition, the burner 1 has an outlet side 7 through which the oxidator gas, possibly enriched with fuel gas which is introduced via the lance 4, discharges from the mixing chamber 3 and for example enters a combustion space 8 of the combustion chamber.

The lance 4 has a foot 9 and also a shank 10. The foot 9 passes through the burner wall 2 and is fastened with a flange 11 on the burner wall 2 on the outside. The burner wall 2 can also have a sealable recess 16 through which the lance 4 can be inserted into the burner 1. The foot 9 extends in the burner 1 essentially perpendicularly to the main flow direction 6. The shank 10 has a cylindrical body and projects from the foot 9 approximately at right angles. In the installed state which is shown, the shank 10 extends centrally in the burner 1 and also parallel to the main flow direction 6. Consequently a longitudinal center axis 12 of the shank 10 extends generally parallel to the main flow direction 6 of the burner 1. According to FIG. 1, a plurality of arms 19 and 20 can be provided on the lance 4 for distribution of the fuel into different regions of the burner 2.

Figure 2:
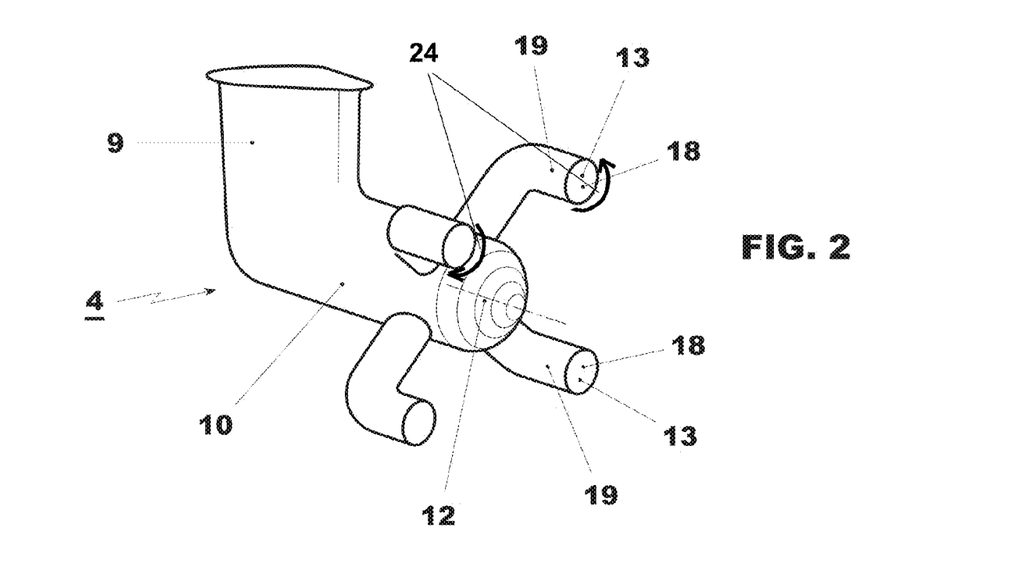
FIG. 2 shows a simplified perspective view of an embodiment of a lance with four arms for fuel injection.

According to FIG. 2, in one embodiment of the lance 4 four nozzles 13 can be provided. In this embodiment, an arm 19 is provided on the shank 10 for each nozzle 13. The respective arm 19 projects radially from the shank 10 with regard to the longitudinal center axis 12 of the shank 10. In this case, the arm 19, as shown here, can be angled. Its longitudinal direction can also include a component which extends parallel to the longitudinal center axis 12, that is to say can be inclined in relation to the pure radial direction. In any case, the respective nozzle 13 can be oriented parallel to the main flow direction 6 so that the main injection direction 14 of the respective nozzle 13 extends parallel to the longitudinal center axis 12 of the shank 10 and therefore parallel to the main flow direction 6 of the burner 1.

The arms 19 are preferably arranged in a uniformly distributed manner on the shank 10 in the circumferential direction. According to the embodiment which is shown in FIG. 2, in this case a configuration is preferred in which no arm 19 is arranged in the direct wake of the foot 9, in which instead the foot 9 is positioned in the axial direction approximately centrally between two arms 19. In addition, the nozzles 13, depending upon the geometry of the burner 1 or of the mixing chamber 3, are radially equidistant in each case from the longitudinal center axis 12 of the shank 10. The eccentric arrangement of the respective nozzles 13, which is realized with regard to the longitudinal center axis 12, enables the spray cone of the individual nozzles 13 to be provided with smaller cone angles, which improves the mixing between fuel and oxidator before ignition.

Figure 3:
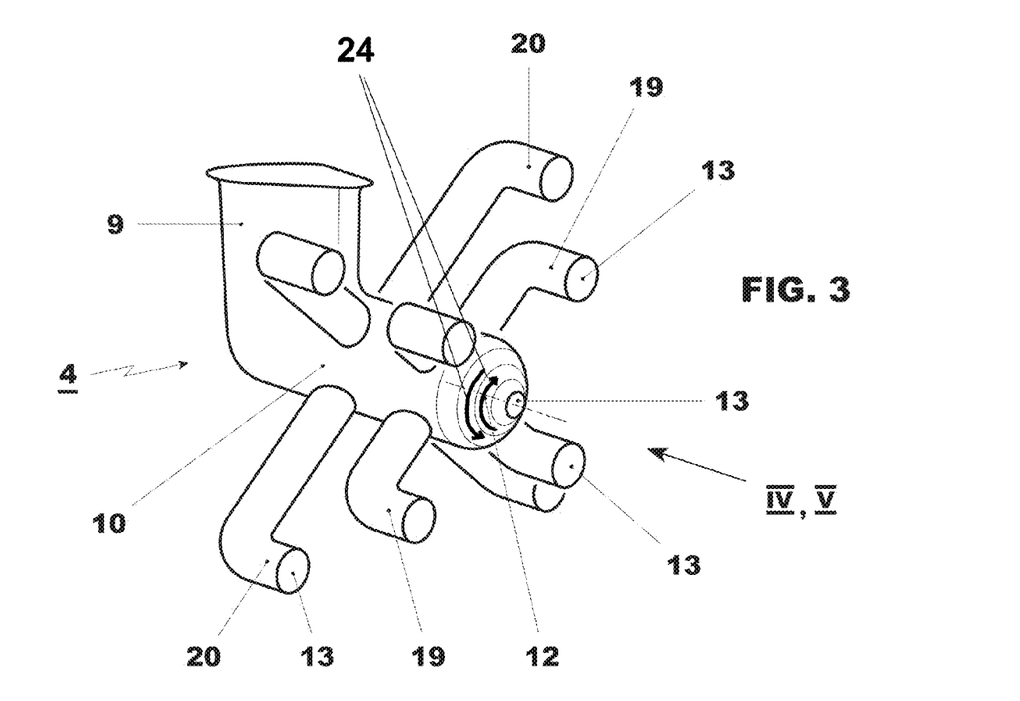
FIG. 3 shows a simplified perspective view of an embodiment of a lance with short and long arms for fuel injection.

An exemplary embodiment of a lance with long arms 20 for introducing fuel into the boundary zones of the burner, and short arms 19 for introducing fuel into the centers of vortices in the burner 2, is shown perspectively in FIG. 3. In order to be able to introduce the fuel, which for example may be natural gas or a combustible gas 18 which contains hydrogen gas or possibly carbon monoxide gas, into the burner 1 or into its mixing chamber 3, the short arms 19 and long arms 20 and also the shank 10 have at least one nozzle 13. This at least one nozzle 13 in this case is configured or arranged on the shank 10 so that it has a main injection direction 14 which is inclined in the direction to the main flow direction 6. The main injection direction 14 in this case is that direction with which the respective nozzle 13 introduces the fuel into the burner 1. In the case of an injection jet which as a rule is conical, this main injection direction 14 corresponds to the longitudinal center axis of the respective spray cone.

The at least one nozzle 13 can be arranged on the end-face, axial outflow-side shank end 15 in each case or on the outflow-side ends of the arms 19 and 20. As a result of this, especially the axial orientation for the main injection direction 14, which is shown in FIG. 1, can be realized in a particularly simple manner.

According to FIG. 3, a plurality of arms 19 and 20 can be provided on the lance 4 for distribution of the fuel. In the example, four nozzles 13, each on a short arm 19, and four nozzles 13, each on a long arm 20, are provided. The respective arm 19, 20 projects radially from the shank 10 with regard to the longitudinal center axis 12 of the shank 10. In this case, the short arms 19 and long arms 20, as shown here, can be angled. The longitudinal direction of the arms can also include a component which extends parallel to the longitudinal center axis 12, that is to say can be inclined in relation to the pure radial direction. In any case, each nozzle 13 points in the axial direction. The nozzles 13 therefore introduce the fuel into the oxidator gas flow with a main injection direction 14 which extends parallel to the longitudinal center axis of the burner 1 and therefore parallel to the main flow direction 6 of the burner 1.

The short arms 19 and long arms 20 are preferably arranged in a uniformly distributed manner on the shank 10 in the circumferential direction. According to the embodiment which is shown in FIG. 3, in this case a configuration is preferred in which no arm 19, 20 is arranged in the direct wake of the foot 9, in which instead the foot 9 is positioned in the axial direction approximately centrally between two short arms 19 or between two long arms 20. In addition, the long arms 20 are positioned upstream of the short arms 19 so that all the arms are in a fuel-free oxidator gas flow.

The eccentric arrangement of the respective nozzles 13, which is realized with regard to the longitudinal center axis 12, enables the spray cone of the individual nozzles 13 to be provided with smaller cone angles, which improves the mixing between fuel and oxidator before ignition.

Figure 4:
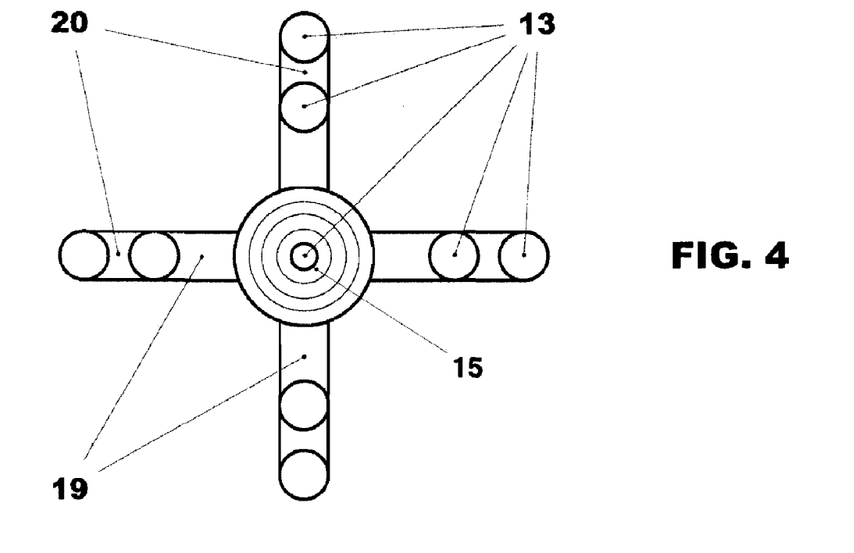
FIG. 4 shows an axial view (IV from FIG. 3) of an arrangement of the arms in the burner in which the short and long arms are arranged one behind the other in the axial direction.
Figure 5:
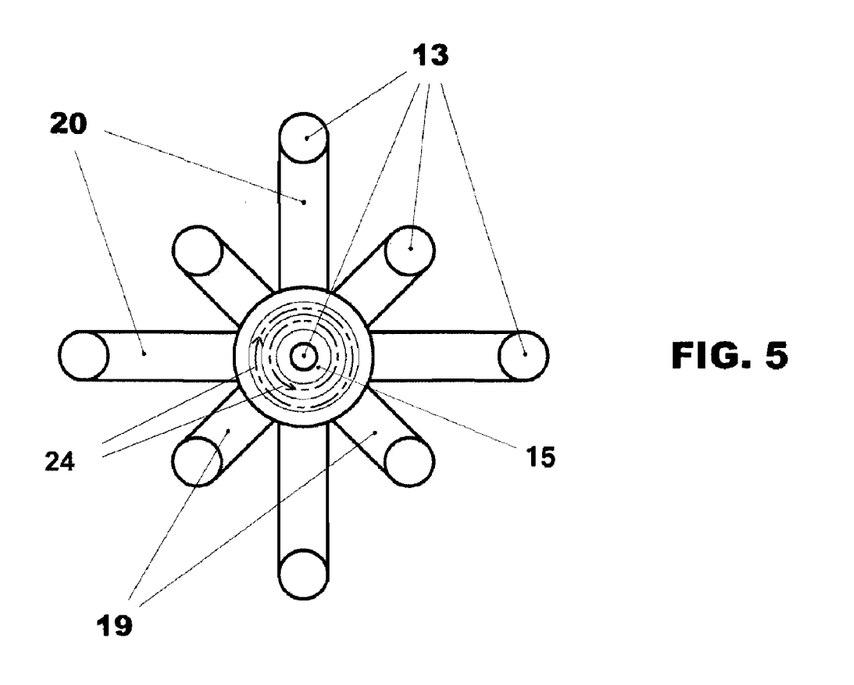
FIG. 5 shows an axial view (V from FIG. 3) of an arrangement of the arms in the burner in which the short arms in relation to the long arms are arranged in a manner in which they are rotated in relation to each other by 45° in the axial direction.

For the arrangement and orientation of the arms 19, 20 of the configurations which are shown in FIG. 2 and FIG. 3, there are a large number of possibilities. Two examples of orientations for combination of short and long arms 19, 20 according to FIG. 3 are shown in FIG. 4 and FIG. 5 in axial view. In the example of FIG. 4, the short arms 19 and long arms 20 are arranged behind each other in the axial direction.

An alternative arrangement is shown in FIG. 5, also in axial view. Here, the short arms 19 in relation to the long arms 20 are arranged in a manner in which they are rotated by 45° in relation to each other in the axial direction.

Figure 6:
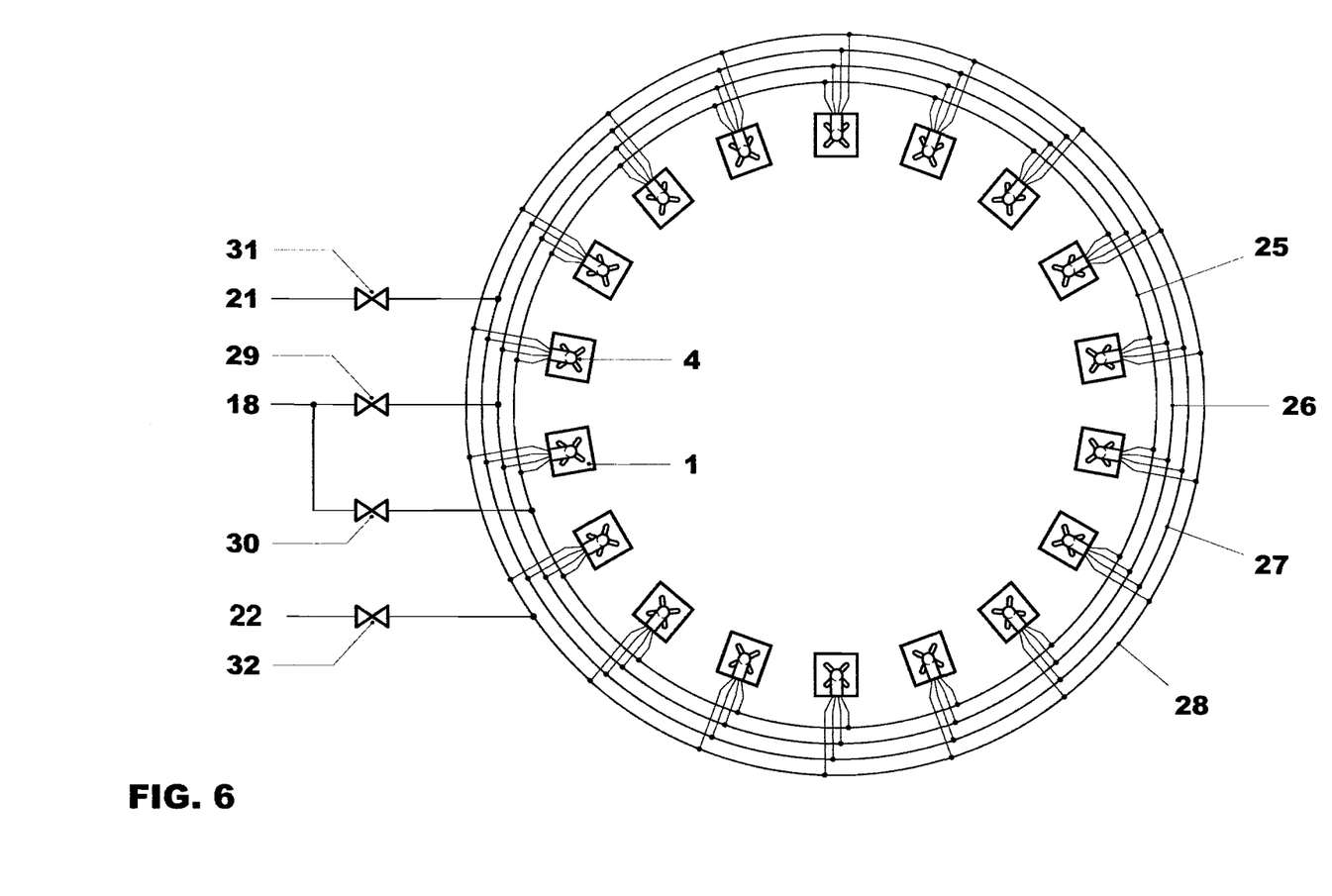
FIG. 6 shows an axial view of the arrangement of the burner with the associated fuel distribution system upstream of an annular combustion chamber.

In FIG. 6, an axial view of an exemplary arrangement of the burner with an associated fuel distribution system upstream of an annular combustion chamber is schematically shown. In the case of the example which is shown, it is an arrangement for dual-fuel operation, that is to say it is a fuel system for combustible gas and liquid fuel. The liquid fuel 21 is introduced into the liquid fuel distribution system 27 via the control valve 31. This liquid fuel distribution system is constructed as a ring main around the burner. From this ring main, branch lines go to the individual burners 1, through which these burners are supplied with the liquid fuel. In the example which is shown, it is assumed from it that the burner can be operated with oil in a dry state, i.e. without admixing of water for reduction of NOx emissions, or that an oil-water emulsion for injecting into the burners 1 has already been produced upstream of the control valve 31. Depending upon the type of burner construction, an oil-water emulsion is first created in the burner 2 or directly on the burner 2. Then it may be necessary to provide a separate water feed line to the individual burners.

The combustible gas 18 is split up and via a control valve for the primary combustible gas flow 29 and via a control valve for the secondary combustible gas flow 30 is directed into the primary combustible gas distribution system 25 and into the secondary combustible gas distribution system 26. The two combustible gas distribution systems are constructed as a ring main around the burners, from which branch lines lead in each case to the individual burners 1. Splitting up allows each burner to be supplied with two variable combustible gas flows and therefore to adapt the combustible gas distribution inside the burner 1 according to the operating conditions. In this case, the primary combustible gas 33 is introduced into the primary combustible gas distribution system 25 in a regulated manner via the control valve for the primary combustible gas flow 29, and via the short arms 19 of the lances 4 introduced into vortex centers of the burners 1. Similarly, the secondary combustible gas flow 34 is introduced into the secondary combustible gas distribution system 26 in a regulated manner via the control valve for the secondary combustible gas flow 30, and via the long arms 20 of the lances 4 introduced into the outer regions of the burners 1. In accordance with the operating point, the entire combustible gas flow can be introduced via the long arms 20 or via the short arms 19, or in any chosen ratio.

Both for operation with liquid fuel 21 and for operation with combustible gas 18, in the example which is shown cooling of the lance 4 with carrier gas is required. Furthermore, in the example the carrier gas 22 is required for enveloping the fuel during injection into the oxidator gas flow. The carrier gas 22 is introduced into the burner 1 in the short arms 19 and also in the long arms 20 of the lances 4 via the control valve for carrier gas 32 and the carrier gas distribution system 28 which comprises a ring main and branch lines to the individual burners 1. In the example which is shown, the entire mass flow of carrier gas can be regulated via the carrier gas control valve 22 in accordance with the operating conditions. In a further possible embodiment, the carrier gas distribution system can be split up and constructed with two control valves and ring mains. Similar to the combustible gas distribution system which is shown, the carrier gas 22 can then be introduced into the burners 1 in a regulated manner via the short arms 19 and the long arms 20 of the lances 4.

Figure 7:
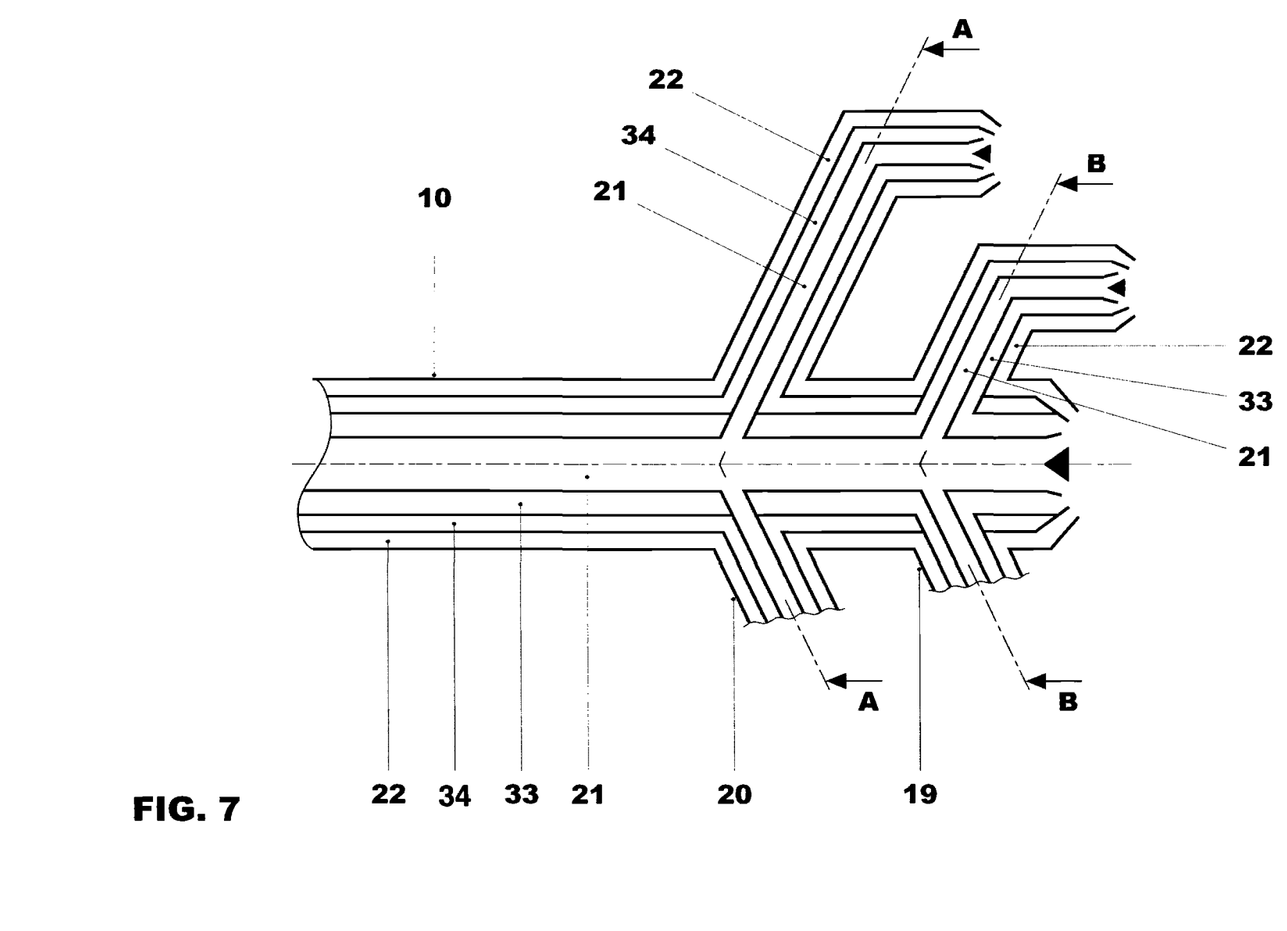
FIG. 7 shows a longitudinal section through shank and arms of a lance for illustrating the fuel and carrier gas distribution.
Figure 8:
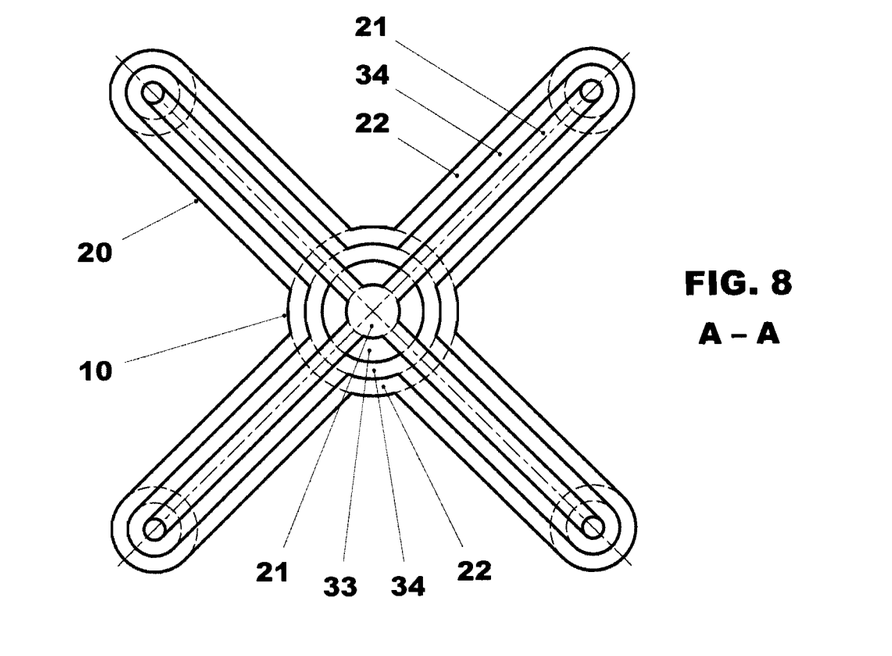
FIG. 8 shows a cross section A-A through the shank and the short arms of a lance for illustrating the fuel and carrier gas distribution.
Figure 9:
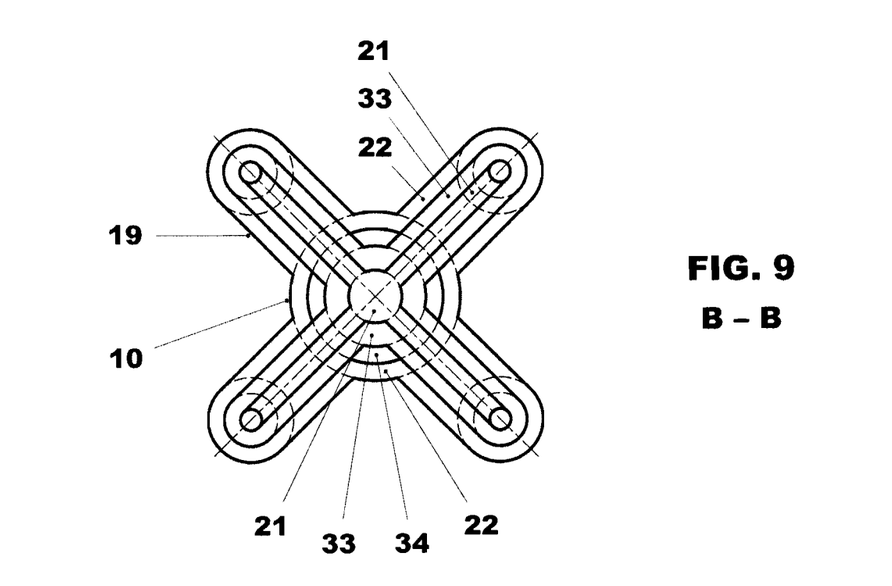
FIG. 9 shows a cross section B-B through the shank and the long arms of a lance for illustrating the fuel and carrier gas distribution.

In FIGS. 7 to 9, the fuel distribution in the lances 4 or in the arms of the lances 4 is schematically shown.

FIG. 7 schematically shows the section through the shank 10 of a lance 4 with four short arms 19 and four long arms 20. The shank 10 and the arms are constructed from concentrically arranged pipes. Through the innermost pipe in each case the liquid fuel can be delivered to the fuel nozzles 13. Through the outermost pipe in each case the carrier gas can be delivered to the fuel nozzles 13.

The second-innermost pipe of the shank 10 is provided for directing the primary combustible gas to the short arms 19 and to the nozzle 13 which is arranged centrally at the end of the shank 10. The third-innermost pipe of the shank 10 is provided for directing the secondary combustible gas to the long arms 20.

In the long arms 20, the secondary combustible gas 34 can be directed via the second-innermost pipe of the long arms 20 to the nozzles 13 at the ends of the arms.

Accordingly, in the short arms 19 the primary combustible gas 34 can be directed via the second-innermost pipe of the short arms 19 to the nozzles 13 at the ends of the arms.

The second-innermost pipe of the shank 10 is provided for injecting the primary combustible gas via nozzles 13 at the ends of the short arms 19 and via the nozzle 13 which is arranged centrally at the end of the shank 10. The third-innermost pipe is provided for injecting the secondary combustible gas via nozzles 13 at the ends of the long arms 20.

In FIG. 8, with reference to the section A-A from FIG. 7, the introduction of the fuels and the carrier gas from the shank 10 into the long arms 20 is shown. The liquid fuel 21 is directed from the innermost pipe of the shank 10 into the innermost pipe of the long arm 20. The secondary combustible gas 34 is directed from the third-innermost pipe of the shank 10 into the second-innermost pipe of the long arms 20 in each case. The carrier gas 22 flows from the outermost pipe of the shank 10 into the outermost pipe of the long arms 20 in each case. There are no connections from the second-innermost pipe of the shank to the long arms 20.

In FIG. 9, with reference to the section B-B from FIG. 7, the introduction of the fuels and the carrier gas from the shank 10 into the short arms 19 is shown. The liquid fuel 21 is directed from the innermost pipe of the shank 10 into the innermost pipe of the short arm 19. The primary combustible gas 33 is directed from the second-innermost pipe of the shank 10 into the second-innermost pipe of the short arms 19 in each case. The carrier gas 22 flows from the outermost pipe of the shank 10 into the outermost pipe of the short arms 19 in each case. There are no connections from the third-innermost pipe of the shank to the short arms 19.

The embodiments and possible principles of operation are not limited to the examples which are shown here. They can be combined or extended in various ways. An example is another arrangement of the fuel feed, in which four coaxial pipes inside each other are not used for the construction of the shank 10 but one pipe with partitioning walls arranged in a crossed manner, which divides the cross-sectional areas of the pipe into four sectors, can be used for the construction of the shank.

A further alternative for example can be a lance with arms in which only combustible gas is injected via the arms, and the liquid fuel 21 is injected only via the at least one nozzle at the shank end 15. Furthermore, a lance for the pure combustible gas operation completely without injection of liquid fuel 21 is conceivable.

In further embodiments, for example carrier gas can also be dispensed with during combustible gas operation and as a result the construction of the lance can be simplified. Furthermore, during liquid fuel operation it is then conceivable for the combustible gas line to be used for the introduction of a carrier gas.

A further embodiment for example make provision for an additional fuel gas feed into the lance 4, by which a natural gas, as for example is disclosed in EP1030109, is conventionally injected radially from the shank 10 into the oxidator flow. With a correspondingly extended combustible gas distribution system, which allows the regulated combustible gas feed, this enables the optimized introduction of two different types of combustible gas.

List of Designations

1 Burner
2 Burner wall
3 Mixing chamber
4 Lance
5 Inlet side
6 Main flow direction
7 Outlet side
8 Combustion space
9 Foot of 4
10 Shank of 4
11 Flange
12 Longitudinal center axis of 10
13 Nozzles
14 Main injection direction
15 Shank end
16 Recess
17 Vortex generator
18 Combustible gas
19 Short arm
20 Long arm 21 Liquid fuel
22 Carrier gas
23
24
25 Primary combustible gas distribution system
26 Secondary combustible gas distribution system
27 Liquid fuel distribution system
28 Carrier gas distribution system
29 Control valve for primary combustible gas flow
30 Control valve for secondary combustible gas flow
31 Control valve for liquid fuel
32 Control valve for carrier gas
33 Primary combustible gas flow
34 Secondary combustible gas flow

What is claimed is:

1. A burner of a combustion chamber of a gas turbine installation with sequential combustion, the burner comprising:
a single burner wall which encloses a single mixing chamber of the burner;
a vortex generator in an inlet region of the burner;
a single lance for introducing gaseous fuel into the burner, the single lance comprising a foot and a shank which projects from it, in an installed state of the lance the foot extends perpendicularly or at an angle to a main flow direction of the burner, the shank extends centrally in the burner and generally parallel to the main flow direction, at least one projecting arm, having at least one nozzle for introducing fuel, is arranged such that the respective arm projects radially from the shank with regard to a longitudinal center axis of the shank, and wherein a longitudinal direction of the arm includes a component which extends parallel to the longitudinal center axis of the shank such that a respective end of the at least one arm is oriented in the main flow direction and extends generally parallel to the main flow direction, wherein the lance is arranged downstream of the vortex generator; and
wherein more than half of a combustible gas is directed at high load as primary combustible gas flow into a center of at least one vortex in the burner via at least one short arm of the lance.

2. The burner as claimed in claim 1, wherein the lance has at least one pipe for carrier gas, for at least one of cooling the lance or for the supply of the at least one nozzle.

3. The burner as claimed in claim 1, wherein the at least one nozzle at the respective end of the at least one arm points in the main flow direction of the burner.

4. The burner as claimed in claim 1, wherein the shank has at least one nozzle for introducing fuel into the burner.

5. The burner as claimed in claim 1, wherein at least one nozzle, which is arranged on the shank, is arranged on an axial end-face of the shank end.

6. The burner as claimed in claim 1, wherein at least one pipe for combustible gas and at least one pipe for carrier gas for the supply of the at least one nozzle of the at least one projecting arm are integrated into the lance.

7. The lance as claimed in claim 1, wherein at least one pipe for a primary combustible gas flow and at least one pipe for a secondary combustible gas flow for the regulated distribution of combustible gas into the burner are integrated into the lance.

8. The burner as claimed in claim 6, wherein at least one pipe for liquid fuel for the supply of the at least one nozzle of the at least one projecting arm is integrated into the lance.

9. The burner as claimed in claim 8, wherein the at least one pipe for liquid fuel supplies at least one nozzle which is arranged on an axial end face of the shank end.

10. The burner as claimed in claim 9, wherein the position of the at least one nozzle of the at least one projecting arm is matched to vortices which are formed in the burner and which are created by the vortex generator which are located upstream the lance.

11. A burner of a combustion chamber of a gas turbine installation with sequential combustion, having a combustion chamber, the burner comprising: a single burner wall which encloses a single mixing chamber of the burner; a vortex generator; and a single lance for introducing fuel into the burner, the single lance comprising a foot and a shank which projects from it, the foot extending perpendicularly or at an angle to a main flow direction of the burner, the shank extending centrally in the burner and generally parallel to the main flow direction, at least one projecting arm, having at least one nozzle for introducing fuel, is arranged such that the respective arm projects radially from the shank with regard to a longitudinal center axis of the shank, and wherein a longitudinal direction of the arm includes a component which extends parallel to the longitudinal center axis of the shank such that a respective end of the at least one arm is oriented in the main flow direction and extends generally parallel to the main flow direction, wherein the lance has at least one nozzle, which is located at an end of the at least one projecting arm, and wherein the vortex generator is located upstream of the at least one projecting arm; and wherein more than half of a combustible gas is directed at high load as primary combustible gas flow into a center of at least one vortex in the burner via at least one short arm of the lance.

12. The burner as claimed in claim 1, wherein the lance has at least one long arm, which reaches into the flow to the extent that the at least one nozzle, which is located at an end of the at least one long arm, injects a secondary combustible gas flow into a boundary region of a vortex, which is created by the vortex generator.

13. The burner as claimed in claim 1, wherein at least two adjacent nozzles are arranged for injecting at least one of combustible gas or carrier gas.

14. The burner as claimed in claim 1, wherein at least one pair of nozzles are arranged on an axial end-face end of the shank, and in that the at least one pair of nozzles are formed for injecting at least one of combustible gas or carrier gas.

15. A method for operating a gas turbine with at least one annular combustion chamber, comprising at least one burner, a combustion space which is connected to the outlet side of the burner, the burner comprising a single burner wall which encloses a single mixing chamber of the burner, a vortex generator in an inlet region of the burner, and a single lance for introducing gaseous fuel, which is arranged downstream of the vortex generator, wherein the single lance comprises a foot and a shank which projects from it, in an installed state of the lance the foot extends perpendicularly or at an angle to a main flow direction of the burner, the shank extends centrally in the burner and generally parallel to the main flow direction, at least one projecting arm, having at least one nozzle for introducing fuel, is arranged such that the respective arm projects radially from the shank with regard to a longitudinal center axis of the shank, and wherein a longitudinal direction of the arm includes a component which extends parallel to the longitudinal center axis of the shank such that a respective end of the at least one arm is oriented in the main flow direction and extends generally parallel to the main flow direction, the method comprising:
generating a vortex, introducing fuel via the at least one nozzle;
regulating the fuel dependent upon at least one of load or another operating parameter of the gas turbine;

mixing the fuel with an oxidizer gas flow;

regulating a proportion of a primary combustible gas flow to a secondary combustible gas flow as a function of at least one of the load or another operating parameter of the gas turbine; and directing at least some of a combustible gas at low load into a boundary region of the burner via at least one long arm of the lance.

16. A method for operating a gas turbine with at least one annular combustion chamber, comprising at least one burner, a combustion space which is connected to the outlet side of the burner, the burner comprising a single burner wall which encloses a single mixing chamber of the burner, a vortex generator in an inlet region of the burner, and a single lance for introducing gaseous fuel, which is arranged downstream of the vortex generator, wherein the single lance comprises a foot and a shank which projects from it, in an installed state of the lance the foot extends perpendicularly or at an angle to a main flow direction of the burner, the shank extends centrally in the burner and generally parallel to the main flow direction, at least one projecting arm, having at least one nozzle for introducing fuel, is arranged such that the respective arm projects radially from the shank with regard to a longitudinal center axis of the shank, and wherein a longitudinal direction of the arm includes a component which extends parallel to the longitudinal center axis of the shank such that a respective end of the at least one arm is oriented in the main flow direction and extends generally parallel to the main flow direction, the method comprising:

generating a vortex, introducing fuel via the at least one nozzle;

regulating the fuel dependent upon at least one of load or another operating parameter of the gas turbine;

mixing the fuel with an oxidizer gas flow; and directing more than half of a combustible gas at high load as primary combustible gas flow into a center of at least one vortex in the burner via at least one short arm of the lance.

17. The method as claimed in claim 15, comprising:

regulating the fuel distribution in the burner dependent upon the reactivity of the combustible gas.

18. A burner of a combustion chamber of a gas turbine installation with sequential combustion, the burner comprising:

a single burner wall which encloses a single mixing chamber of the burner;

a vortex generator in an inlet region of the burner;

a single lance for introducing gaseous fuel into the burner, the single lance comprising a foot and a shank which projects from it, in an installed state of the lance the foot extends perpendicularly or at an angle to a main flow direction of the burner, the shank extends centrally in the burner and generally parallel to the main flow direction, at least one projecting arm, having at least one nozzle for introducing fuel, is arranged such that the respective arm projects radially from the shank with regard to a longitudinal center axis of the shank, and wherein a longitudinal direction of the arm includes a component which extends parallel to the longitudinal center axis of the shank such that a respective end of the at least one arm is oriented in the main flow direction and extends generally parallel to the main flow direction, wherein the lance is arranged downstream of the vortex generator, and wherein the at least one projecting arm comprises:

a plurality of projecting arms, the plurality of projecting arms including at least one long projecting arm for introducing fuel into the boundary zones of the burner and at least one short projecting arm for introducing fuel into the centers of vortices in the burner, and wherein the respective end of the at least one long projecting arm is upstream of the respective end of the at least one short projecting arm.

\* \* \* \* \*